United States Patent Office 3,803,188
Patented Apr. 9, 1974

3,803,188
MANUFACTURE OF METALLIC SOAPS
Leonard Frank Scott, Monrovia, Howard D. Strachan, El Monte, and Chester M. McCloskey, Altadena, Calif., assignors to The Norac Company, Inc., Azusa, Calif.
No Drawing. Continuation-in-part of abandoned application Ser. No. 840,503, July 9, 1969. This application Mar. 10, 1971, Ser. No. 123,062
Int. Cl. C08h 17/36
U.S. Cl. 260—413
25 Claims

ABSTRACT OF THE DISCLOSURE

Metallic soaps of Group II of the Periodic Table are prepared by dispersing the metal oxide in a higher fatty acid and mixing therewith 3.5 to 40 mole equivalents of water based on fatty acid. Surfactants are useful catalysts for the reaction.

---

This application is a continuation-in-part of copending application Ser. No. 840,503 filed July 9, 1969, now abandoned.

The present invention relates to a process for the manufacture of metallic soaps and in particular to metallic soaps prepared from metals in Group II of the Period Table and the higher fatty acids of from about 12 to about 22 carbon atoms which acids are known and sold to the industry as commercial fatty acids. The commercial fatty acids as commonly used are usually mixtures of higher fatty acids in which the name attached to them may be only the dominant acid of the mixture and in some grades of commercial stearic acid may not even be the acid present in the largest proportion. The most common soaps are those prepared from magnesium, calcium and zinc and have found wide application in commerce as waterproofing agents, thickening and suspension agents, lubricating and anticaking agents. They are also used as stabilizing agents for plastics, particularly polyvinyl chloride.

Metallic soaps of the higher fatty acids, the most common of which are the metallic stearates, are prepared by three principal types of processes.

(1) Double decomposition process

A hot aqueous solution of the sodium salt of the fatty acid (prepared by reaction of the fatty acid and aqueous caustic) is reacted with a hot aqueous solution of the appropriate metal salt. The insoluble metal soap precipitate is filtered, washed free of soluble salt, dried and milled. By far the largest amount of commercial metallic soap of the Group II metals and particularly those known as stearates are produced by this process. By proper control of the temperature and dilution a product with a very fine crystal size is obtained that is ideal for many applications. The preparation, washing and drying operations are all expensive and time consuming and the material therefore inherently has a high production cost. The product is easily milled however.

(2) Reaction of metal oxides and hydroxides with molten fatty acids (a) Fusion process: The molten fatty acid is reacted with the appropriate metal oxide or hydroxide at a high temperature (150°–200° C.) to form the metallic soap and water which is driven off at the high reaction temperature. The reaction requires from 3 to 5 hours for completion. This process is used extensively but produces a material which is hard and glassy in nature and is difficult to grind to a fine particle size. It is principally useful where a fine particle size and the surface characteristics of the metal soap are not responsible for its usefulness.

(b) Modified fusion process: A mixture of the liquid fatty acid and metal oxide is mixed with a very small amount of water. The reaction then takes place forming the metallic soap and the water which is formed is driven off in the process by the high temperature. This process has the advantage of a much lower reaction temperature. The initial temperature generally being in the range of 90° to 100° C. with a top temperature of from 100° to 200° + C. This process still produces, however, a material of a hard glassy nature that is difficult to grind to a product that approaches the properties of Process No. 1.

(c) Semi-fused or slurry process: The molten fatty acid is reacted with an aqueous slurry of the metal hydroxide or oxide (sometimes carbonates) during a period of over two or more hours to form the metallic soap. Considerable heat is required to drive off the excess water and complete the reaction. Lower temperatures are normally employed in this reaction due to the water present but it also produces a hard granular material which is also often difficult to grind and has a high moisture content and therefore must be dried for a period of time before milling. This makes the process both time consuming and expensive.

(3) Metal-acid reaction process. In this process molten fatty acid is reacted directly with the metal yielding the metallic soap and hydrogen. This process is not used extensively in the preparation of metallic soaps from the metals of Group II of the Periodic Table and does not produce material of the desired physical characteristics for many applications.

There are other processes that can be employed for the preparation of metallic soaps from metals of Group II. However, the three mentioned are used to produce the great preponderance of material currently being manufactured commercially. In spite of the advantages in many applications of the product produced by the precipitation or double decomposition process, considerable material is still produced by the fusion and modified fusion processes. This is a result of the lower cost of both the raw materials and the processing.

The modified fusion process was a major advance over the fusion process in the manufacture of metallic soaps involving metals of Group II. As indicated above it substantially reduce the initiation temperature for reaction and to a lesser extent also the maximum temperature attained, as well as a reduction in time to complete the reaction. The modified fusion process is carried out by adding water, with stirring, to a mixture of fused fatty acid and metallic oxide or hydroxide. Reaction is initiated normally in the range of 90° to 100° C. It then goe through an exotherm and at the high oxide to fatty acid ratios usually employed in the process the reaction is often complete enough in 10 minutes to cool and mill. The amount of water added to the fatty acid-oxide mixture usually ranges between 1 and 1.5 mole-equivalents of water based on fatty acid or from 0.5 to somewhat over 1 mole-equivalents based on metal oxide employed. Extremes of 0.5 to 3 in both ratios have been claimed.

It has been discovered that by dispersing the finely ground metal oxides of Group II in molten higher fatty acids and mixing well therein from 3.5 to 40 mole-equivalents of water per mole-equivalent of fatty acid, products are obtained that are soft friable solids, low in free fatty acid and easily milled to give products with properties that approach those of precipitated metallic soaps in slip, texture and bulk. The reaction initiates rapidly and proceeds to completion in a minimum of time at temperatures that seldom exceed 110° C. and more usually 101–105° C. in the final stages. These temperatures are significantly lower than the softening point of the metallic soaps being prepared. The moisture content, although higher than the modified fusion process, is low enough that additional drying is not required, except at the higher moisture to acid ratios, as the moisture is easily removed during milling. The reaction velocity is increased so that a shorter reaction time is required. This is shown both by reduction in induction time and in free fatty acid content. The reaction time and the product character in any specific case is dependent to some extent on the fatty acid and the metal oxide employed as well as the ratios of reactants.

In the preferred embodiment of the instant invention, the metal oxide is dispersed in the molten fatty acid and the proper amount of water is thoroughly mixed into the dispersion mixture at a temperature between 90° and 135° C. The use of pressure in this portion of the reactor is required to insure proper mixing when temperatures above 100° C. are employed. While pressures above atmospheric can be employed during the entire reaction it is preferred to reduce the pressure to atmospheric before the reaction mixture solidifies. Temperatures as low as 55° C. may be employed to start the reaction. The time required for the initial vigorous reaction exotherm to start (induction time) however, is so much longer at the lower temperatures, that a temperature in the neighborhood of 90°+ is preferred for commercial processing. Otherwie, means to reach this temperature in the reaction chamber should be provided to conserve time. The optimum mole-equivalent ratio of water to fatty acid varies somewhat depending on the particular oxide and fatty acid employed, and to some extent also on the ratio of metallic oxide to fatty acid. In general the process is operable in the range from 3.5–1 to at least 40–1 mole-equivalents of water to fatty acid. The preferred ratio, in order to obtain optimum properties, however, is in the range of 5–1 to 40–1 for most of the oxides. The higher ratio of water, although producing a satisfactory product, is uneconomical except where high moisture content is desired such as in the production of aqueous suspensions since thte remval of the excess moisture is very costly. There is little improvement in the properties of the products after a ratio of approximately 10–1 is reached. The practical range of ratios preferred for commercial operation where the product is to be milled is the range from 6–1 to 15–1 and more usually 6–1 to 12–1. It is an essential part of this process that the metal oxide first be dispersed in the fatty acid and then the water added. Dispersal of the oxide in the water prior to its addition to the fatty acid gives a product with entirely different characteristics to that obtained in the process of instant invention and one with a much longer reaction time.

The metal of Group II of the Periodic Table are generally applicable in instant process. However, the oxides of barium, calcium, cadmium, magnesium, strontium and zinc lend themselves particularly well to this process. The oxides of calcium, magnesium and zinc are the preferred oxides in the process, which is fortunate, since they have the greatest commercial value. It is important that the proper oxides be utilized to obtain the best results. The finer the particle size of the metallic oxide and the better the dispersion in the fatty acid, the more rapid and uniform is the reaction, and the better the quality of the metallic soap produced. In general a coarse oxide or one that is poorly dispersed (although there is some dependence on the particular oxide involved), either will not react well or will produce a product with a high free fatty acid, particularly at low oxide to acid ratios. Simple mixing of the metal oxide into the fatty acid has been found to greatly extend reaction time required and to give a poorer product than is obtained by thorough dispersion.

It has been found that the surface condition of the oxide has a large effect on the rate of reaction. For instance, American process zinc oxide dispersed in a fatty acid reacts extremely rapidly with the fatty acid on the introduction of water. However, French process zinc oxide tends to react very slowly initially under the same conditions. In many cases it is important to have a long pot life of the metal oxide-fatty acid dispersion and since the pot life is extended greatly by utilizing French process zinc oxide in place of the American process oxide, a catalyst must be utilized to obtain equivalent reaction speeds. Soluble salts of zinc, such as zinc nitrate, sulfate and chloride, nitric and acetic acid, sodium and potassium hydroxide all have shown some catalytic activity in accelerating the rate of reaction of fatty acids with metal oxides in the instant process. Surface active agents (surfactants), however, have been found to be the most effective catalysts.

Anionic, cationic and nonionic surfactants all act as catalysts and accelerate the reaction. Catalytic activity however, varies considerably from compound to compound. Surface active agents found to be active include: alkanolamides, ethoxylated alcohols, ethoxylated alkyl phenols, ethoxylated amines and amides, ethoxylated fatty acids, ethoxylated fatty esters, faty acid esters (including esters of glycol and glycerol), fluorinated fatty aid salts, tertiary amine oxides, lecithin and derivatives, phosphate esters and other derivatives, quaternary ammonium compounds and sorbitan derivatives. The most active compounds have been the sulfonates, sulfates and related compounds. Examples of the latter are: alkyl sulfonates, sulfated and sulfonated amines and amides, isethionates, alcohol sulfates, ethoxylated alcohol sulfates, sufonates of benzene, naphthalene, diphenyl, diphenyl ether and their alkyl derivatives, condensed naphthalene sulfonates, fatty acid and natural oil sulfonates and sulfates, petroleum sulfonates and taurates.

Exceedingly small concentrations of the more active sulfates and sulfonates greatly accelerate the instant reaction. Concentrations as low as 0.001% based on fatty acid, increase the reaction rate significantly. As the concentration of surfactant is increased the rate of reaction increases also. Concentrations as high as 5% are effective. At these high concentrations the surfactant may adversely affect the surface properties of the metallic soap produced for some uses and thus concentrations in the range from 0.01 to 1.0% are preferred with concentrations in the range from 0.02 to 0.5% the most common. The latter ranges give good rates without adverse effects on the physical properties of the product.

It has been found that the catalytic action of the surfactants is not limited to the process of the instant invention but is effective for the entire range of mole-equivalnt ratios of water to fatty acid from 0.5 to 40 and operative range of ratios of metal oxide to fatty aid.

The catalytic activity of the surface active sulfonates, sulfates and related compounds is exhibited by the reduction of the induction time for the reaction with zinc and cadmium oxides or by the reduction of the free fatty acid concentration as with the calcium and magnesium oxides. With calcium and magnesium oxides the reaction appears to be rapid and vigorous without a surfactant but a catalyst is required if a low free fatty acid content is desired in a short reaction time.

The cation associated with the sulfonate or sulfate is not critical as long as it forms a salt with the anion that has reasonable solubility in water at the reaction temperature. Thus ammonium, sodium, potassium, calcium and magnesium salts are operative. The surfactant can be incorporated in either the water or fatty acid dispersion. It is commonly incorporated in the water. Examples of anions giving exceptional activity are: dodecyl and tridecyl benzenesulfonates, dodecylnapthalene sulfonate, dodecyldiphenyl ether disulfonate, dodecyl to heptadecyl sulfates, octylphenoltetraethoxy sulfate, dioctyl ester of sodium sulfosuccinic acid, dodecyl ester of sodium isethionate, potassium N-methyl-N-oleoyltaurate and Post 4 (a product of the Baker Castor Oil Company). These are typical only. The alkyl groups can be straight chain or branched. The groups that give good surface activity are well known in the art and have been extensively researched. Thus 2-ethylhexyl sulfate which is not highly surface active is not as active a catalyst as dodecyl or tetradecyl sulfates which are surface active. The classification of surfactants and identification is given in McCutcheon's "Detergents and Emulsifiers Annual," John W. McCutcheon, Inc., Morristown, N.J. Reference is also made to "Surface Chemistry" by Osipow A.C.S. Monograph Series No. 153, and "Emulsions Theory and Practice" by Becher, A.C.S. Monograph Series No. 162, Reinhold Publishing Company.

A wide range of fatty acids can be employed. Lauric, myristic, palmitic, stearic, arachidic and behenic acids all work very well as do their mixtures obtained commercially. In their relatively pure state the unsaturated fatty acids such as oleic and palmoleic acids have not been found to react as readily as the saturated acids, often giving products that are hard to handle or incompletely reacted. The amounts found in commercial single pressed and triple pressed stearic acid, tallow fatty acid and hydrogenated tallow fatty acids as well as hydrogenated fish fatty acid, coconut fatty acid and others have not presented any difficulty and have operated well. The term "higher fatty aids" as used herein refers to those predominantly saturated fatty acids and including $C_{12}$ to $C_{22}$ and their common commercial mixtures. For ease in processing, the fatty acids should be free from contaminants that will react prematurely with the metallic oxide prior to the addition of the water or that will catalyze the metal oxide to fatty acid reaction during the initial mixing. As described above, there are a number of compounds which appear to exercise a degree of catalysis on the reaction of Group II oxides with the fatty acids particularly in the presence of water. It has been found that some of the low grade commercial fatty acids such as that commonly called "rubber grade" stearic acid and which normally contain large quantities of impurities are sometimes difficult to utilize in the process of the instant invention due to their premature reaction with the metal oxides. A considerable variation in the rate of reaction of various commercial fatty acid compositions with the metallic oxides has been observed. Since most commercial fatty acids are from natural product sources, some variation is to be expected. This has presented no problems.

The maximum temperature obtained during the bulk of the reaction may go as high as 115° C. in isolated cases but is generally below 110° C. and usually below 105° C. While the reaction proceeds very rapidly at the higher mole-equivalent ratios (2 to 1 and above) of metal oxide to fatty acid, it also proceeds rapidly and to completion at lower ratios of the order of 1.2–1.05 to 1. At very low mole-equivalent ratios (of the order of 1 to 1 and lower, metal oxide to fatty acid) longer reaction times are required with some oxides in order to obtain a product with a low free fatty acid. Below a ratio of 1 to 1 the free fatty acid increases as expected. Ratios as low as 0.5 to 1 can be employed.

The instant process is readily adapted to continuous processing. The metal oxide-fatty acid dispersion is either prepared continuously or in batches as the dispersion has a long potlife with most oxides. The water, usually containing a surfactant, is mixed continuously with the fatty acid dispersion. The dispersion and water are either heated before mixing or after mixing to initiate the reaction. After the reaction is initiated it is continued in the neighborhood of 100° C. until the desired free fatty acid concentration is obtained. The product is commonly milled without cooling. When the temperature of the initial reaction is raised to obtain shorter induction and reaction time, the ratio of water to fatty acid must also be raised to provide sufficient cooling to prevent fusion of the product. A significant feature of the continuous process is that the product can be milled hot due to its physical form avoiding delays and further processing.

As used herein, the term mole-equivalent as applied to water refers to an equivalent weight of 8. Metals of Group II of the Periodic Table refer to the metals beryllium, calcium, magnesium, zinc, strontium, cadmium and barium. Surfactants employed as catalysts can be added with either ingredient or separately such as with the actylenic alcohols which show mild catalytic activity. The term ethoxylated alcohol sulfates include sulfates of ethoxylated alkylphenols as well as ethoxylated alkyl alcohols and other similar compounds.

It should be noted when comparing rates of reaction from free fatty acid content that a correction must be made for the effect of temperature on the reaction.

The invention will be further described by reference to the following examples which set forth the specific embodiments of the present invention. These embodiments however, are merely illustrative and not to be construed as limitative of the present invention.

EXAMPLE 1

Zinc oxide was dispersed in a molten commercial hydrogenated fatty acid (200 g.) In the molecular ratio indicated at 95° C. Water (98° C.) was introduced in the molecular ratio indicated and thoroughly mixed in. After 10 minutes the product was removed, air dried and milled once on a Pulverizing Machinery laboratory hammer mill. The apparent density of the milled product was determined with Scott Volumeter.

| Fatty acid | Oxide | Mole-equiv. ratio Oxide/fatty acid | Mole-equiv. ratio Water/fatty acid | Peak temp., ° C. | Time to exotherm, min. | Apparent density, g./cu./in. |
|---|---|---|---|---|---|---|
| Stearic acid [1] | Zinc | 1.2:1 | 1.0:1 | 124 | 12 | 5.94 |
| Do | do | 1.2:1 | 2.0:1 | 110 | 2.7 | 4.96 |
| Do | do | 1.2:1 | 2.5:1 | 108 | 1.6 | 4.69 |
| Do | do | 1.2:1 | 3.0:1 | 107 | 1.3 | 4.65 |
| Do | do | 1.2:1 | 4.0:1 | 105 | 1 | 4.34 |
| Do | do | 1.2:1 | 5.0:1 | 105 | 1.2 | 4.18 |
| Do | do | 1.2:1 | 7.0:1 | 104 | 0.4 | 3.64 |
| Do | do | 1.2:1 | 4.0:1 | | | 3.68 |
| Stearic acid [2] | do | 1.2:1 | 7.0:1 | | | 3.19 |
| Do | do | 1.2:1 | 5.0:1 | | | 3.52 |
| Stearic acid (87%) | do | 1.2:1 | Reacted before water could be added | | | 3.11 |
| Caprylic acid (95%) | do | 1.2:1 | 8.0:1 | 106 | | 4.86 |
| Lauric acid (95%) | Calcium | 1.4:1 | | | | 2.55 |
| Fish fatty acid | Zinc | | | | | |
| Precipitated zinc stearate | | | | | | |

[1] Hydrogenated tallow fatty acid.
[2] Commercial double pressed stearic acid.

EXAMPLE 2

Calcium oxide was dispersed in a molten commercial hydrogenated fatty acid (1 kg.) in the mole ratio of 1.2:1 at 90° C. Water (90° C.) was introduced in the mole ratio indicated and thoroughly mixed in. When the reaction product had cooled it was air dried and milled once on a Pulverizing Machinery Company laboratory hammer mill. The apparent density of the milled product was determined with a Scott Volumeter. Samples were taken at 10 minutes and cooled in sealed containers. These were dried and the moisture content determined.

| Mole-equivalent ratio water/FA | Apparent density, g./cu. in. | Moisture content, percent |
|---|---|---|
| 2:1 | 6.95 | 0.06 |
| 3:1 | 6.06 | |
| 4:1 | 5.70 | 2 |
| 5:1 | 5.31 | |
| 6:1 | 5.10 | 17 |
| 8:1 | 4.60 | 12 |
| 10:1 | 4.15 | 15 |
| 20:1 | 4.11 | 32 |

EXAMPLE 3

Calcium oxide was dispersed in 1 kg. of molten hydrogenated tallow fatty acid at 90° C. (1.2 mole-equiv. ratio oxide to fatty acid) and water (90° C.), in sufficient quantity to give the following mole-equiv. ratios, was added. Stirring continued 10 seconds.

| Mole-equiv. ratio water/fatty acid | Time to exotherm, sec. | Time to peak of exotherm, min. | Peak temp., °C. | Percent FFA | Product state (10 min.) | Millable hot |
|---|---|---|---|---|---|---|
| 1:1 | 30 | 3.5 | 137.5 | 3.8 | Sticky, plastic mass | No. |
| 2:1 | 30 | 5 | 130 | 4.2 | do | No. |
| 3:1 | 25 | 6 | 115.5 | 4.3 | Foamy, sticky plastic mass | No. |
| 4:1 | 20 | 11 | 112 | 5.2 | Foamy, semiplastic | No. |
| 5:1 | 20 | 11 | 108 | 6.8 | Soft, friable solid at <5 min. | Yes. |
| 6:1 | 20 | 1.8 | 102 | 7.1 | do | Yes. |
| 7:1 | 20 | <1 | 101 | 3.9 | do | Yes. |
| 8:1 | 20 | <1 | 101 | 3.2 | do | Yes. |
| 10:1 | 20 | <1 | 101 | 2.8 | do | Yes. |
| 20:1 | 20 | <1 | 101 | 1.1 | do | Yes. |

EXAMPLE 4

Metallic stearate was prepared as in Example 1 at 90° C. and passed twice through the laboratory hammer mill. A mole-equiv. ratio of 1.2:1 metal oxide to commercial hydrogenated tallow fatty acid was employed.

| Metal oxide | Mole-equiv. ratio water/fatty acid | Free fatty acid, percent | Percent retained on— 200 mesh | Percent retained on— 325 mesh |
|---|---|---|---|---|
| Zinc | 10/1 | 1.23 | 0.45 | 1.8 |
| Do | 20/1 | 0.28 | | |
| Calcium | 7/1 | 1.1 | 0.25 | 1.25 |

EXAMPLE 5

Metallic stearates were prepared as in Example 1 in the ratios given below from a commercial stearic acid.

| Metal oxide | Mole-equiv. ratio Oxide/fatty acid | Mole-equiv. ratio Water/fatty acid | Free fatty acid, percent |
|---|---|---|---|
| Zinc | 1.0:1 | 1:1 | 3.85 |
| Do | 1.0:1 | 2:1 | 4.9 |
| Do | 1.0:1 | 3:1 | 4:3 |
| Do | 1.0:1 | 4:1 | 1.35 |

EXAMPLE 6

A commercial double pressed stearic acid was reacted with metallic oxide and water as in Example 1 at 93° C.

| | Mole-equiv. ratio Metal oxide/ fatty acid | Water/ fatty acid | Water/ metallic oxide | Free fatty acid, percent |
|---|---|---|---|---|
| Zinc oxide | 1.0:1 | 7.5:1 | 7.50:1 | 1.68 |
| Do | 1.2:1 | 7.5:1 | 6.25:1 | 0.98 |
| Do | 1.5:1 | 7.5:1 | 5.00:1 | 0.56 |
| Do | 2.0:1 | 7.5:1 | 3.75:1 | 0.45 |
| Do | [1] 0.9:1 | 10:1 | 11.10:1 | 12.03 |
| Do | [1] 0.5:1 | 10:1 | 20:1 | 54.90 |

[1] Hydrogenated tallow fatty acid.

EXAMPLE 7

The following metal oxides were dispersed in the molten fatty acid (200 g.) and method of Example 1.

| | Mole-equiv. ratio Metal oxide/FA | Water FA | Additional temp., °C. | Comment |
|---|---|---|---|---|
| SrO | 1.1:1 | 7.5:1 | 87 | No reaction took place until water added, then immediate vigorous reaction. |
| | 1.5:1 | 7.5:1 | | |
| BaO | 1.1:1 | 4.0:1 | 87 | Reaction took place shortly after addition of oxide. Water must be added immediately to the dispersion to obtain proper reaction. |
| | 1.5:1 | 7.5:1 | | |
| CdO | 1.2:1 | [1] 10:1 | 90 | No reaction took place until water added. Mixture took 13 min. to begin vigorous exotherm. |
| MgO | 1.16:1 | 7.5:1 | 55 | No reaction took place until water added then immediate vigorous reaction. |

[1] Orvus AB added (0.4 g).

EXAMPLE 8

Zinc stearate was prepared as in Example 1 with a mole-equiv. ratio of water to fatty acid of 7.5:1 only the water was added at various temperatures and the time to reach 100° C. noted.

American process zinc oxide

| Temperature (°C.): | Time |
|---|---|
| 60 | 4 min. |
| 70 | 2 min. |
| 80 | 1 min. |
| 90 | 25 sec. |
| 95 | 10 sec. |

EXAMPLE 9

(a) 34.4 g. of powdered zinc oxide (French process) was dispersed in 200 g. of hydrogenated tallow fatty acid and the temperature maintained with stirring at 100° C. for 5 hours. No change in viscosity was observed.

(b) The process of (a) was repeated with American process zinc oxide. After three hours the mixture thickened and underwent an exothermic reaction.

(c) The materials of (a) were heated for 5 minutes at 100° C. then cooled, allowed to solidify and stand for 48 hours then reheated and maintained at 100° C. for 3 hours. No change was observed.

(d) The process of (a) was repeated with 20.8 g. of finely powdered calcium oxide. No change was observed.

EXAMPLE 10

68.6 g. zinc oxide (American process) was dispersed in 400 ml. water and heated to 95° C. This slurry was added to 400 g. of molten commercial hydrogenated fatty acid at 95° C. with vigorous stirring. (A paddle stirrer driven by an air motor was used.) The temperature slowly rose to 100° C. (10 minutes), when steam began to be evolved. The reaction mixture was held for 30 minutes, then cooled and dried.

FFA=15%

The same amounts of reactants and same temperature were used. The zinc oxide was dispersed in the water in an Osterizer. The slurry was then added to the molten acid in the Osterizer while mixing at the highest speed. Steam began to be evolved within 15 seconds and temperature reached 108° C. After 10 minutes the product was cooled and dried.

FFA=12%

EXAMPLE 11

The process of Example 1 was carried out with zinc oxide at a mole-equiv. ratio of 1.2 metal oxide to fatty acid (400 g.) and 4:1 water to fatty acid starting with fatty acid zinc oxide dispersion and water at 96° C. Fatty acids and zinc oxides as indicated were employed.

| Fatty acid | Zinc oxide | Additive to water | Time to exotherm | Peak temp. |
|---|---|---|---|---|
| Hydrogenated tallow FA | American | None | 3 sec. | 108 |
| Do | French | do | >30 min. | |
| Do | do | 0.6 g. Zn(NO$_3$)$_2$ | 10 min. | 107 |
| Do | do | 0.2 g. NaOH | 3 min. | 105 |
| Do | do | 0.2 g. acetic acid | 2 min. | 110.5 |
| Do | do | 0.1 g. Triton 100 [1] | 1.5 min. | |
| Do | do | 0.05 g. SDBS [2] | 1 min. | 109 |
| Do | do | 0.10 g. SDBS [2] | 30 sec. | 110 |
| Humko 4516 | do | None | 5 sec. | 110 |
| Double pressed | do | do | 5 min. | 106 |
| | | Additive to fatty acid | | |
| Hydrogenated tallow FA | do | 2 g. oleic acid | 1 min. | 103 |

[1] Product of Rhom & Haas Company.
[2] Sodium dodecylbenzene sulfonate.

EXAMPLE 12

Continuous preparations of metal stearates were made by pumping a 1.2 to 1 mol-equiv. ratio dispersion of metal oxide in molten commercial stearic acid into a pressurized mixing chamber along with the mole-equiv. ratio of water containing Orvus AB [1] in the concentration specified below, heated to 100° C. After passing through the pressurized mixing device it was discharged at atmospheric pressure, into a mixer conveyor with a stay time of 3.7 minutes. Copious amounts of steam were evolved during the reaction. Where possible, the product was milled hot as it discharged from the mixer conveyor.

| Metal oxide | Water: acid ratio | Percent detergent in water | Mixing temp., °C. | Product form on discharge | Free fatty acid, percent |
|---|---|---|---|---|---|
| ZnO | 4:1 | 0.113 | 85 | Granular, M | 0.8 |
| ZnO | 4:1 | 0.113 | 125 | Plastic, lumpy, U | |
| ZnO | 8:1 | 0.113 | 125 | Soft, friable, M | 0.40 |
| ZnO | 10:1 | 0.113 | 125 | do | 0.38 |
| ZnO | 4:1 | None | 125 | Semiplastic, U | |
| CaO | 10:1 | None | 125 | Soft, friable, M | 5.9 |
| CaO | 10:1 | 0.3 | 125 | do | 2.5 |
| CaO | 10:1 | 0.3 | 135 | do | 2.0 |
| CaO | 8:1 | 0.3 | 135 | do | 2.1 |

NOTE.—U=Unmillable hot; M=Millable hot.

EXAMPLE 13

Zinc oxide (177.5 g.) (French process) was dispersed in 1 kg. of molten hydrogenated tallow fatty acid at 95°

[1] A product of Procter and Gamble—40% sodium dodecylbenzene sulfonate.

C. Water (670 g.) at 95° C. containing 1 g. of the surfactant indicated (unless otherwise noted) was mixed thoroughly with the dispersion. The induction time for the vigorous reaction to start was noted.

| | Surfactant | Active ingredient, percent | Induction time |
|---|---|---|---|
| 1 | Control | 0 | 7 min. |
| 2 | Estrex P60 | 100 | 2 min. 30 sec. |
| 3 | Emid 6500 | 100 | 4 min. 40 sec. |
| 4 | Post 4 | <100 | 40 sec. |
| 5 | Surfactol 666 | 100 | 4 min. 5 sec. |
| 6 | Surfactol 318 | 100 | 6 min. 30 sec. |
| 7 | Arlacel 83 | 100 | 5 min. 45 sec. |
| 8 | Tween 85 | 100 | 3 min. 30 sec. |
| 9 | Tween 60 | 100 | 3 min. |
| 10 | Tween 20 | 100 | 6 min. |
| 11 | Span 20 | 100 | 5 min. 30 sec. |
| 12 | Surfynol PC | 100 | 4 min. 35 sec. |
| 13 | Surfynol PC [1] | 100 | 4 min. 30 sec. |
| 14 | Surfynol 104 | 100 | 3 min. 55 sec. |
| 15 | Surfynol 104 [1] | 100 | 4 min. 5 sec. |
| 16 | Surfynol 465 | 100 | 3 min. 10 sec. |
| 17 | Surfynol 440 | 100 | 6 min. 40 sec. |
| 18 | Surfynol 82 | 100 | 6 min. |
| 19 | Pluronic L-61 | 100 | 3 min. 25 sec. |
| 20 | Solar F-342 | 100 | 3 min. 5 sec. |
| 21 | Emulsifier F221 | | 3 min. 20 sec. |
| 22 | Witco 912 | | 2 min. 30 sec. |
| 23 | Witco 960 | | 3 min. |
| 24 | Emcol T-24 | | 3 min. |
| 25 | Tamol SN | 25 | 3 min. 30 sec. |
| 26 | Tamol 731 | 30 | 2 min. 45 sec. |
| 27 | Arquad 12 | 100 | 3 min. 25 sec. |
| 28 | BTC 1100 | 50 | 5 min. 10 sec. |
| 29 | Triton H55 | 35 | 3 min. 30 sec. |
| 30 | Aerosol 22 | 100 | 4 min. 10 sec. |
| 31 | Aerosol OT | 86 | 35 sec. |
| 32 | Blancol N | 67 | 2 min. 40 sec. |
| 33 | Igepon T-77 | 58 | 1 min. 40 sec. |
| 34 | Alipal AB-436 | 58 | 53 sec. |
| 35 | Alipal CO-436 | 83 | 1 min. 10 sec. |
| 36 | Igepon AC-78 | 65 | 1 min. |
| 37 | Nekal BA-75 | 100 | 45 sec. |
| 38 | Gafac RM-510 | 90 | 3 min. 24 sec. |
| 39 | Nacconol 90-F | 40 | 22 sec. |
| 40 | Orvus AB | 85–90 | 30 sec. |
| 41 | Conco AAS-90 | 85–90 | 27 sec. |
| 42 | Conco AAS-90 [1] | 90 | 35 sec. |
| 43 | Benox 2Al | 27 | 45 sec. |
| 44 | Tergitol 7 | 27 | 1 min. 45 sec. |
| 45 | Tergitol 7 (3.7 g.) | 40 | 50 sec. |
| 46 | Tergitol 08 | 28 | 1 sec. 45 sec. |
| 47 | Tergitol 4 (3.7 g.) | 70 | 2 min. 10 sec. |
| 48 | Victawet 35-B | 90 | 3 min. 10 sec. |
| 49 | Maprofix Powder LK | 100 | 50 sec. |
| 50 | Calcium dodecylbenzenesulfonate | 100 | 40 sec. |
| 51 | Dowfax 9N9 | 100 | 6 min. |
| 52 | Sulfricin | 100 | 3 min. 22 sec. |
| 53 | Fluorochemical FC-128 | 100 | 5 min. |
| 54 | Zinc sulfate (2 g.) | 100 | 5 min. |
| 55 | Alkanol 189S | | 1 min. 10 sec. |

| | Surfactant manufacturer | Surfactant chemical structure |
|---|---|---|
| 1 | | |
| 2 | Swift & Company | Oleic ester of polyethylene glycol. |
| 3 | Emery Industries | Coco monoethanolamide. |
| 4 | Baker Castor Oil Company | Sulfonated castor oil derivative. |
| 5 | do | Ethoxy propoxy castor oil. |
| 6 | do | Ethoxylated castor oil. |
| 7 | Atlas Chemical Industries | Sorbitan sesquioleate. |
| 8 | do | Polyoxyethylene sorbitan trioleate. |
| 9 | do | Polyoxyethylene sorbitan monostearate. |
| 10 | do | Polyoxyethylene sorbitan monolaurate. |
| 11 | do | Sorbitan monolaurate. |
| 12 | Airco Chemical | Acetylenic glycol blend. |
| 13 | do | Do. |
| 14 | do | 2,4,7,9-tetramethyl-5-decyne-4,7-diol. |
| 15 | do | Do. |
| 16 | do | Ethoxylated #14. |
| 17 | do | Dimethyloctynediol. |
| 18 | do | Ethoxylated polypropylene glycol. |
| 19 | Wyandotte Chemicals Corp. | Modified amide. |
| 20 | Swift & Company | Unknown. |
| 21 | do | Polyoxyethylene esters of mono and dicarboxylic acids plus oil soluble sulfonates. |
| 22 | Witco Chemical Company | |
| 23 | do | Unknown. |
| 24 | do | Do. |
| 25 | Rohm and Haas Company | Sodium salt of condensed naphthalene sulfonic acid. |
| 26 | do | Sodium salt of polymeric carboxylic acid. |
| 27 | Armour Industrial Chemical Co. | N-alkyl trimethyl ammonium chloride. |
| 28 | Onyx Chemical Company | Alkyl dimethyl naphthyl-methyl-ammonium chlorides. |
| 29 | Rohm and Haas Company | Potassium salt phosphate compound. |
| 30 | American Cyanamide | Tetrasodium N-(1,2-dicarboxyethyl)-N-octadecylsulfosuccinamate. |
| 31 | do | Dioctyl ester of sodium sulfosuccinic acid. |
| 32 | General Aniline and Film Corp. | Sodium salt of sulfonated naphthalene-formaldehyde condensate. |
| 33 | do | Sodium N-methyl-N-oleoyltaurate. |
| 34 | do | Ammonium salt sulfated linear primary alcohol ethoxylate. |
| 35 | do | Ammonium salt of sulfate ester o ethoxylated alkyl phenol. |
| 36 | do | Coconut-oil acid ester of sodium isethionate. |
| 37 | do | Sodium alkylnaphthalene sulfonate. |
| 38 | do | Acids of complex organic phosphate esters. |
| 39 | Allied Chemical | Alkyl aryl sulfonate. |
| 40 | Procter & Gamble | Sodium linear alkylaryl sulfonate. |
| 41 | Continental Chemical Company | Sodium dodecylbenzene sulfonate. |
| 42 | do | Do. |
| 43 | Dow Chemical Company | Sodium dodecyldiphenylether disulfonate. |
| 44 | Union Carbide Corporation | Sodium 5,11-diethyltridecan-8-ol sulfate. |
| 45 | do | Do. |
| 46 | do | Sodium 2-ethyl-1-hexylsulfate. |
| 47 | do | Sodium 5-ethyl-10-methyl-undecane-5-ol sulfate. |
| 48 | Stauffer Chemical Company | $(Na)_5(2\text{-ethylhexyl})_5(P_3O_{10})_2$. |
| 49 | Onyx Chemical Company | Sodium lauryl sulfate. |
| 50 | Laboratory preparation | Calcium dodecylbenzenesulfonate |
| 51 | Dow Chemical Company | Oxyethylenated nonylphenol. |
| 52 | Baker Castor Oil | Unknown. |
| 53 | Minnesota Mining and Manufacturing. | Fluorochemical surfactant. |
| 54 | Commercial Chemical | |
| 55 | E. I. du Pont de Nemours & Co. | Sodium hydrocarbon sulfonate. |

[1] Surfactant added to fatty acid.

EXAMPLE 14

French process zinc oxide was reacted with commercial hydrogenated tallow fatty acid (1 kg.) in the method of Example 1 in the mole-equivalent ratio of 1.2:1, and a water to acid ratio of 10:1. Orvus AB [2] in the amount specified was dissolved in the water at 95° C. prior to its addition to the acid-oxide mixture at 95° C.

| Detergent as percent of acid: | Induction time, min. |
|---|---|
| None | 7 |
| .001 | 5 |
| .0025 | 3.5 |
| .005 | 2.6 |
| .0125 | 2 |
| 0.25 | 1.5 |
| .05 | 1.0 |
| .10 | 0.5 |
| .20 | 0.25 |
| .25 | 0.25 |
| .5 | 0.28 |
| 1.0 | 0.25 |
| 5.0 | 0.25 |

EXAMPLE 15

The reaction of the metal oxides indicated with the fatty acid indicated and water was carried out in the stated mole equivalent ratios according to the procedure described in Example 13.

[2] Same as footnote 1, Example 12.

| Fatty acid | Oxide | Mole-equiv. ratio Oxide/FA | Water/FA | Surfactant | Percent | Induction time, minutes |
|---|---|---|---|---|---|---|
| Hydrogenated tallow fatty acid | Zinc | 1.2:1 | 3:1 | None | | 4.0 |
| Do | do | 1.2:1 | 3:1 | Orvis AB [1] | 0.1 | 0.9 |
| Do | do | 1.2:1 | 2:1 | None | | 4.3 |
| Do | do | 1.2:1 | 2:1 | Orvis AB | 0.1 | 0.85 |
| Do | do | 1.2:1 | 1:1 | None | | 3.7 |
| Do | do | 1.2:1 | 1:1 | Orvis AB | 0.1 | 0.85 |
| Do | do | 1.2:1 | 1:1 | do | 0.01 | 3.0 |
| Do | do | 1.2:1 | 1:1 | do | 0.05 | 1.65 |
| Do | do | 1.2:1 | 1:1 | Sepan LS [2] | | 5.7 |
| Do | do | 1.2:1 | 0.5:1 | None | | 0.8 |
| Do | do | 1.2:1 | 0.5:1 | Orvis AB | 0.1 | 5.0 |
| Do | do | 1:1 | 3:1 | None | | 0.8 |
| Do | do | 1:1 | 3:1 | Orvis AB | 0.1 | 1.6 |
| Do | do | 2:1 | 1:1 | None | | 0.7 |
| Do | do | 2:1 | 1:1 | Orvis AB | 0.05 | 0.5 |
| Do | do | 2:1 | 3:1 | Nekal BA-75 [3] | 0.1 | 0.6 |
| Do | do | 2:1 | 3:1 | Igepon T-77 [4] | 0.1 | 1.2 |
| Do | do | 2:1 | 3:1 | Igepon AP-78 [5] | 0.1 | 0.4 |
| Do | do | 2:1 | 3:1 | Calcium dodecylbenzene sulfonate | 0.1 | 0.4 |
| Do | do | 2:1 | 3:1 | Nacconol 90F [6] | 0.1 | 0.4 |
| Do | do | 2:1 | 3:1 | Sodium dodecylbenzene sulfonate [7] | 0.1 | 0.4 |
| Do | do | 2:1 | 3:1 | Sodium lauryl sulfate [8] | 0.1 | 1.0 |
| Do | do | 2:1 | 3:1 | Aerosol OT [9] | 0.1 | 1.2 |
| Do | do | 2:1 | 3:1 | Tergitol TOL Anionic 7 [10] | 0.1 | 0.5 |
| Do | do | 2:1 | 2:1 | None | | 0.2 |
| Do | Calcium | 2:1 | 2:1 | Orvis AB | 0.1 | 0.2 |
| Do | do | 2:1 | 2:1 | do | 0.025 | 0.15 |
| Do | do | 2:1 | 2:1 | None | | 0.05 |
| Do | Magnesium | 2:1 | 2:1 | Orvis AB | 0.1 | 0.3 |
| Do | do | 2:1 | 2:1 | | | 0.1 |
| Fish fatty acid | Zinc | 1.2:1 | 1.5:1 | None | | [11] 1.4 |
| Do | do | 1.2:1 | 1.5:1 | Orvis AB | 0.1 | [11] 0.6 |
| Laurie | do | 1.15:1 | 1.5:1 | None | | [11] 1.1 |
| Do | do | 1.15:1 | 1.5:1 | Nekal BA-75 | 0.05 | [11] 1.1 |
| Do | do | 1.15:1 | 1.5:1 | do | 0.01 | [11] 0.4 |
| Do | do | 1.15:1 | 1.5:1 | Nacconol 90-F | 0.05 | |
| Do | do | 1.15:1 | 1.5:1 | Igepon T-77 | 0.05 | |

For footnotes see the following table:

| Surfactant manufacturer | Percent active ingredient if known | Surfactant, chemical structure, if known |
|---|---|---|
| (1) Procter & Gamble | 40 | Sodium linear-alkylaryl sulfonate. |
| (2) Sepan LS | | |
| (3) General Aniline & Film | 65 | Sodium alkylnaphthalene sulfonate. |
| (4) do | 67 | Sodium N-methyl-N-oleoyl taurate. |
| (5) do | 83 | Coconut oil acid ester of sodium isethionate. |
| (6) Allied Chemical | 90 | Alkylaryl sulfonate. |
| (7) | 90 | |
| (8) Onyx Chemical Co. | 90 | |
| (9) American Cyanamid | 100 | Tetra sodium N (1,2-dicarb-ethoxyl)-N-octodecyl sulfosuccinamate. |
| (10) Union Carbide | 27 | Sodium 5, 11-diethyltridecan-8-ol sulfate. |
| (11) Reaction temperature 54° C. | | |

We claim:

1. The process of preparing metallic soaps comprising dispersing oxides of metals of Group II of the Periodic Table in a molten higher fatty acid, mixing water with said dispersion in a range of about 5 to 40 mole-equivalents per mole of fatty acid, initiating the reaction at a temperature above 55° C. and allowing said mixture to react, the temperature of the final stages being below the softening point of the metallic soap.

2. The process of claim 1 in which the metals of Group II are selected from the group consisting of calcium, magnesium, zinc, cadmium, strontium and barium.

3. The process of claim 2 in which the proportion of water to fatty acid is in the range of 6 to 40 mole-equivalents of water per mole of fatty acid.

4. The process of claim 3 in which the metals of Group II are selected from the group consisting of: calcium, magnesium and zinc.

5. The process of claim 4 in which the proportion of water to fatty acid is in the range of 6–15 mole-equivalents of water per mole of fatty acid.

6. The process of claim 5 in which the proportion of water to fatty acid is in the range of 6–12 mole-equivalents of water per mole of fatty acid.

7. The process of claim 6 in which the metal of Group II is calcium.

8. The process of claim 6 in which the metal of Group II is zinc.

9. The process of preparing metallic soaps comprising dispersing oxides of metals of Group II of the Periodic Table in a molten higher fatty acid, mixing water with said dispersion in a range of about 0.5 to 40 mole-equivalents per mole of fatty acid, initiating the reaction at a temperature above 55° C. and allowing said mixture to react in the presence of a minor portion of surface active sulfonates or sulfates.

10. The process of claim 9 in which the mole-equivalent ratio of water to fatty acid is from 3.5 to 40 and the temperature of the final stages of the reaction is below the softening point of the metallic soap.

11. The process of claim 10 in which the concentration of surfactant is from 0.001% to 5% based on fatty acid.

12. The process of claim 11 in which the surfactant is selected from the group consisting of: a water soluble salt of a surface active alkylarylsulfonate, alkyldiphenyl ether disulfonate, alkyl sulfonate, alkyl sulfate, sulfate of ethoxylated alcohol and alkylphenol, isethionate, taurate, sulfated and sulfonated natural oil, sulfosuccinate ester.

13. The process of claim 13 in which the metal oxide is selected from a group consisting of calcium, magnesium, zinc, strontium, barium and cadmium.

14. The process of claim 14 in which the metal oxide is selected from the group consisting of calcium, magnesium and zinc.

15. The process of claim 14 in which the surfactant is selected from the group consisting of water soluble salts of dioctyl sulfosuccinate, dodecylbenzenesulfonate, alkyl-naphthalene sulfonate, dodecyldiphenyl ether disulfonate, Post 4, dodecyl to heptadecyl sulfates, dodecyl ester isethionate, N-oleoyl-N-methyl taurate, octylphenoltetraethoxy sulfate.

16. The process of claim 9 in which the metal oxide of Group II is selected from the group consisting of zinc, calcium and magnesium.

17. The process of continuously preparing metallic soaps of metals of Group II of the Periodic Table which comprises continuously mixing a dispersion of the metallic oxide in a higher fatty acid with about 5 to 15 mole-equivalents of water per mole of fatty acid, said water being in sufficient quantity to prevent fusion of the product on completion of the reaction, initiating the reaction at over 55° C., allowing the reaction to proceed and continuously milling the product as produced.

18. The process of continuously preparing metallic soaps of metals of Group II of the Periodic Table which comprises continuously mixing a dispersion of the metallic oxide in a higher fatty acid with about 3.5 to 15 mole-equivalents of water per mole of fatty acid, said water being in sufficient quantity to prevent fusion of the product on completion of the reaction, initiating the reaction at over 55° C. in the presence of a minor portion of surface active sulfonates or sulfates and continuously milling the product.

19. The process of claim 18 in which the oxide of a metal of Group II is selected from the group consisting of: calcium, magnesium, zinc, strontium, cadmium and barium.

20. The process of claim 18 in which the oxide of metal of Group II is selected from the group consisting of calcium, magnesium and zinc.

21. The process of claim 20 in which the concentration of surfactant is between 0.001 and 5.0% by weight based on fatty acid.

22. The process of claim 21 in which the reaction is initiated between 90° and 135° C.

23. The process of claim 22 in which the mole-equivalent of water per mole of fatty acid is between 6 and 12.

24. The process of preparing zinc soaps comprising dispersing zinc oxide in a molten higher fatty acid, mixing water with said dispersion in a range of about 4 to 40 mole-equivalents per mole of fatty acid, initiating the reaction at a temperature above 55° C. and allowing said mixture to react, the temperature of the final stages being below the softening point of the metallic soap.

25. The process of continuously preparing zinc soaps which comprises continuously mixing a dispersion of the zinc oxide in a higher fatty acid with about 4 to 15 mole-equivalents of water per mole of fatty acid, said water being in sufficient quantity to prevent fusion of the product on completion of the reaction, initiating the reaction at over 55° C., allowing the reaction to proceed and continuously milling the product as produced.

References Cited

UNITED STATES PATENTS

| | | | |
|---|---|---|---|
| 2,890,232 | 6/1959 | Rogers et al. | 260—414 |
| 3,519,571 | 7/1970 | Szczepanek et al. | 260—414 X |

OTHER REFERENCES

| | | | |
|---|---|---|---|
| 698,963 | 10/1953 | Great Britain | 260—413 |

LEWIS GOTTS, Primary Examiner

E. G. LOVE, Assistant Examiner

U.S. Cl. X.R.

260—414